United States Patent
Chauhan et al.

(10) Patent No.: US 12,518,210 B2
(45) Date of Patent: Jan. 6, 2026

(54) MACHINE LEARNING TECHNIQUES TO PREDICT TASK EVENT

(71) Applicant: Oracle Financial Services Software Limited, Goregaon (IN)

(72) Inventors: Shital Reprendra Singh Chauhan, Bangalore (IN); Mridul Kumar Nath, Bangalore (IN); Vipesh Ambala Parambath, Kozhikode (IN); Abraham Ivan, Bangalore (IN); Shweta Shree, Bangalore (IN)

(73) Assignee: Oracle Financial Services Software Limited, Goregaon (IN)

( * ) Notice: Subject to any disclaimer, the term of this patent is extended or adjusted under 35 U.S.C. 154(b) by 828 days.

(21) Appl. No.: 17/847,134

(22) Filed: Jun. 22, 2022

(65) Prior Publication Data
US 2023/0419165 A1    Dec. 28, 2023

(51) Int. Cl.
*G06N 20/00*    (2019.01)

(52) U.S. Cl.
CPC ................... *G06N 20/00* (2019.01)

(58) Field of Classification Search
None
See application file for complete search history.

(56) References Cited

U.S. PATENT DOCUMENTS

| | | | | |
|---|---|---|---|---|
| 2015/0379072 A1* | 12/2015 | Dirac | ...................... | G06N 20/00 707/693 |
| 2022/0207931 A1* | 6/2022 | Hinduja | .................. | G06N 20/20 |

OTHER PUBLICATIONS

Amaral, Claudio AL, et al. "Enhancing completion time prediction through attribute selection." Conference on Advanced Information Technologies for Management. Cham: Springer International Publishing, 2018. (Year: 2018).*

Verenich, Ilya, et al. "Survey and cross-benchmark comparison of remaining time prediction methods in business process monitoring." ACM Transactions on Intelligent Systems and Technology (TIST) 10.4 (2019): 1-34. (Year: 2019).*

Huang, Jing, Qing Chang, and Jorge Arinez. "Product completion time prediction using a hybrid approach combining deep learning and system model." Journal of Manufacturing Systems 57 (2020): 311-322. (Year: 2020).*

(Continued)

*Primary Examiner* — Eric Nilsson
(74) *Attorney, Agent, or Firm* — Kilpatrick Townsend & Stockton LLP

(57) ABSTRACT

Machine learning techniques are disclosed for predicting a task event such as a service completion event based on a predefined workflow. In one aspect a method includes obtaining initial data for a service request (e.g., an account application), enriching the initial data with data from one or more repositories of an enterprise executing the service request, generating a data structure comprising independent variables extracted from the enriched data, receiving a request for a prediction of a completion time for the service request (e.g., an account opening event) at a first time during processing of the service request in accordance with each workflow, in response to receiving the request for the prediction, inputting the data structure into a machine-learning regression model, predicting, using the machine-learning regression model, a completion time for the service request, and providing the completion time for the service request.

14 Claims, 9 Drawing Sheets

(56) References Cited

OTHER PUBLICATIONS

"Turn Around Time (TAT)", retrieved from https://www.kotak.com/en/customer-service/grievance-redressal/personal-banking/turnaround-time.html, Accessed from Internet on May 20, 2022, 3 pages.

"Turnaround Times in Axis Bank", retrieved from https://www.axisbank.com/docs/default-source/default-document-library/turnaround-times.pdf, 6 pages.

Chauhan et al., "Predicting Account Opening Date of Retail Banking Products", pp. 1-6.

Chauhan et al., "Predictive Big Data Analytics for Service Requests: A Framework", Procedia Computer Science, vol. 198, retrieved from https://www.sciencedirect.com/science/article/pii/S1877050921024558, Jan. 2022, pp. 102-111.

Eichhorn, "Predict IT Support Tickets with Machine Learning and NLP", retrieved from https://towardsdatascience.com/predict-it-support-tickets-with-machine-learning-and-nlp-a87ee1cb66fc, Apr. 20, 2020, 13 pages.

Huang, "How Machine Learning Helps Predict the Time-To-Completion of a Ticket", SAP Blogs, retrieved from https://blogs.sap.com/2019/06/18/how-machine-learning-helps-predict-the-time-to-completion-of-a-ticket/, Jun. 18, 2019, 8 pages.

* cited by examiner

MACHINE LEARNING TECHNIQUES TO PREDICT TASK EVENT

FIELD

The present disclosure relates generally to predicting the turn-around-time or completion time for a given task, and more particularly, to machine learning techniques for predicting a task event such as an account opening service completion event as an account application moves through a predefined workflow.

BACKGROUND

Various algorithms are used by machine learning systems to examine data, learn from the data, and make decisions based on what the systems learn from the data. Supervised algorithms include classification and regression algorithms, while un-supervised algorithms include clustering and association algorithms. Supervised algorithms provide a way of predicting future happenings between a dependent (target) and one or more independent variables (also known as a predictor). In other words, supervised algorithms provide a way of mathematically sorting out which of those variables does indeed have an impact. The independent variables are utilized by the model to explain or predict changes in the dependent variable. The dependent variable is what the model is attempting to explain or predict. Regression and classification have a wide range of real-life applications and are important for any machine learning problem that involves continuous numbers or decisions. This includes financial forecasting and time-to-completion forecasting, which may use regression algorithms, while weather analysis and sports predictions may use classification algorithms.

Tasks (i.e., pieces of work or services to be performed) permeate all aspects of our lives. There is growing recognition that high-quality customer service while completing tasks is key in today's competitive markets. Companies are seeking ways to meet customer demands and increase their satisfaction. When customers seek performance of various tasks, they expect quick, transparent and effective performance of the tasks. On the other side of the transaction, a team of service agents may be processing a high volume of tasks. The agents' goal is to provide a pleasant interaction with the customer while performing their assigned tasks. However, in reality, some apparently easy and frequently asked questions such as: 'how long is this going to take?' are often difficult to answer. In order to provide answers to this question and others pertaining to various tasks, many companies are turning to machine learning systems to examine task related data, learn from the data, and make predictions based on what the systems learn from the data. For example, a predictive model can be trained to estimate the time to complete a task by leveraging the hidden structure of historical records and the use of machine learning algorithms. The predictive models provide a customized solution based on individual customer datasets. After models are trained with customer data, they may be applied to new tasks at the time of creation. Thus, service agents can make use of an estimated time-to-completion in early stages of the customer interaction.

SUMMARY

Techniques are provided for predicting the turn-around-time for a given service request task using machine learning techniques. In various instances, the given task is opening an account using a predefined workflow and predicting the turn-around-time pertains to predicting the amount of time required to accomplish task completion, e.g., by when the account will be opened. Various embodiments are described herein, including methods, systems, non-transitory computer-readable storage media storing programs, code, or instructions executable by one or more processors, and the like.

In various embodiments, a computer-implemented method is provided comprising: obtaining initial data for a service request, wherein the initial data comprises basic information captured as part of a service initiation including profile data for a user originating the service request, the service request, one or more products pertaining to the service request, and characteristics associated with the one or more products; enriching the initial data with data from one or more repositories of an enterprise executing the service request, wherein the enriching comprises augmenting the initial data with the data from the one or more repositories to generate enriched data, and wherein the data comprises a workflow for each of the one or more products, stages of each workflow, and data segments defined for the stages; generating a data structure comprising independent variables extracted from the enriched data, wherein the independent variables include a just-in-time position of the service request within each workflow; receiving a request for a prediction of a completion time for the service request at a first time during processing of the service request in accordance with each workflow; in response to receiving the request for the prediction, inputting the data structure into a machine-learning regression model; predicting, using the machine-learning regression model, a completion time for the service request, wherein the predicting comprises determining a relationship between the independent values and the completion time of the service request; and providing the completion time for the service request.

In some embodiments, generating the just-in-time position of the service request comprises: upon entry of the service request into a stage of the workflow for each of the one or more products, a data entry is created in the data structure to record an ENTRY of the service request into the stage and an initial time step of 0; as the service request is processed in the stage in accordance with configured data segments and application parameters, a data entry is created in the data structure to record a REST of the service request within the stage and actual accrued duration while in processing; and when processing of the service request in the stage is completed, a data entry is created in the data structure to record an EXIT of the service request from the stage, an actual duration spent by the service request within the stage, ENTRY of the service request into a next stage, and an initial time step of 0 for the next stage.

In some embodiments, the computer-implemented method further comprises receiving a change in data including accruing duration of a stay of the service request in a stage, collection of data defined by one or more of the data segments, completion of a portion of one or more data segments, or a combination thereof, and updating the data structure in accordance with the change in the data.

In some embodiments, the computer-implemented method further comprises receiving a change in stage of the service request and updating the data structure in accordance with the change in the data.

In some embodiments, updating the data structure comprises updating the just-in-time position of the service request based on the change in the data or the change in the stage.

In some embodiments, the computer-implemented method further comprises: receiving a subsequent request for the prediction of an updated completion time for the service request at a second time during processing of the service request in accordance with each workflow; in response to receiving the subsequent request for the prediction, inputting the updated data structure into the machine-learning regression model; predicting, using the machine-learning regression model, the updated completion time for the service request, wherein the predicting comprises determining the relationship between the independent values and the updated completion time of the service request; and providing the updated completion time for the service request.

In some embodiments, the providing the completion time or the updated completion time comprises communicating the completion time or the updated completion time to a user.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
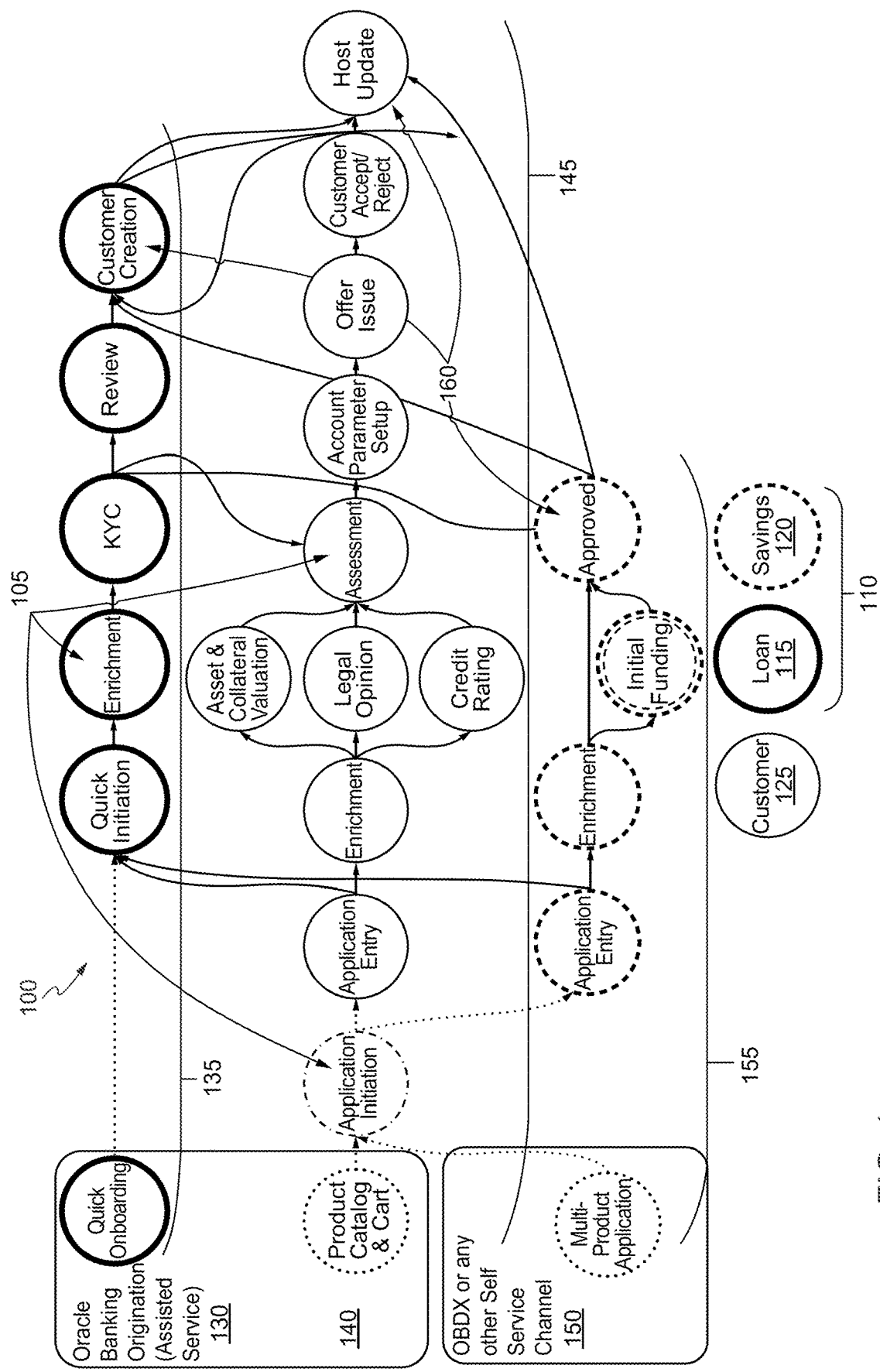
FIG. 1 depicts a block diagram illustrating a reference workflow example and its interdependencies in accordance with various embodiments.

The various embodiments described herein may be used in an assortment of different domains and contexts. Certain embodiments are particularly applicable to enterprise application software provided in distributed computing technology. However, the systems and methods described herein may be used to provide data transformation functionality for any system or application framework where one can ascertain how a change in the value of each independent variable affects the value of the dependent variable(s).

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Providing a defined turn-around time to an end user (e.g., a customer) for opening of product accounts (e.g., a loan account, a savings account, a checking account, and the like) in enterprises (e.g., banks) has always been challenging. Enterprises have been unable to provide a clear timeline for account opening to the end user due to varied reasons that can lead to delay in application processing for opening product accounts. The conventional practice for an enterprise such is to define a turn-around-time (TAT) based on internal historic data for service requests and then evaluate post-facto if the account opening happened within those timelines or there was a delay or advancement in the opening. A few enterprises also conduct a periodic TAT benchmarking exercise with peer enterprises and work towards rationalization of the defined TATs. Some of these approaches are limited to specific types of customer requests or during grievances raised by the users—and do not address the realities that a enterprises such as a bank or a financial institution faces when dealing with product origination requests from users. Account origination processing involves layers of review, verification, and assessment from different agent personas within the enterprise. In many cases, these agent personas are part of different departments, which makes the origination processes more complicated than the mere customer service requests or complaints. Thus, with the defined TATs enterprises still find difficulty in confirming a clear timeline especially for the most critical aspect of products and services such as retail banking, i.e., the account origination. Transparency and real-time status that is one of the most important aspects during any product origination gets seriously impacted due to this challenge.

In order to overcome this challenge and others, various techniques disclosed herein attempt to predict the account opening date for the defined products such as current account, savings account, term deposit account and loan account by considering various parameters of the available user data, number of users in the account application, the product being originated, the consideration of collateral, guarantors, and more significantly, handling stage fluidity arising out of dynamic real time position of an application in defined workflow stages, using machine-learning models, and thereby making these TAT projections closer to reality. In one embodiment, a computer-implemented method for predicting an account opening date of a banking product is provided that includes: obtaining initial data for a service request, where the initial data comprises basic information captured as part of a service initiation including profile data for a user originating the service request, the service request, one or more products pertaining to the service request, and characteristics associated with the one or more products; enriching the initial data with data from one or more repositories of an enterprise executing the service request, where the enriching comprises augmenting the initial data with the data from the one or more repositories to generate enriched data, and where the data comprises a workflow for each of the one or more products, stages of each workflow, and data segments defined for the stages; generating a data structure comprising independent variables extracted from the enriched data, where the independent variables include a just-in-time position of the service request within each workflow; receiving a request for a prediction of a completion time for the service request at a first time during processing of the service request in accordance with each workflow; in response to receiving the request for the prediction, inputting the data structure into a machine-learning regression model; predicting, using the machine-learning regression model, a completion time for the service request, where the predicting comprises determining a relationship between the independent values and the completion time of the service request; and providing the completion time for the service request.

Advantageously, the techniques disclosed herein use machine-learning models to predict the account opening date of the banking product origination. Additionally, the techniques disclosed herein handle real-time data movement fluidity, which is the ability to consume data at any point of exposure within the organization, in the form desired. This provides complete transparency by predicting in real time the account opening date based on the data-points and how the origination workflow is progressing in the real business case. Additionally, this allows an organization such as a bank to provide better customer service during origination and will confirm their commitment towards providing effective customer experience.

Workflow Configuration and Managing Data Fluidity

FIG. 1 depicts a block diagram illustrating a reference workflow example 100 and its interdependencies in accordance with various embodiments. A workflow such as workflow example 100 includes the stages 105 executed for a service request pertaining to one or more banking product accounts 110 (e.g., a loan account, a savings account, a checking account, and the like). The bank (i.e., a user at the bank) configures each workflow at the time of setting up each of the one or more banking product accounts 110 as a product or service offering of the bank. In certain instance, the banking product accounts 110 pertain to retail account origination such as opening a retail checking account, a retail savings account, a retail term deposit account or a retail loan account in a bank. For example, the reference workflow example 100 depicts a multi-product origination that includes a retail savings account 120 and a retail loan account 115 for a new retail customer 125. A first workflow 130 is configured for onboarding a new retail customer 125 via various stages 135. A second workflow 140 is configured for opening a retail loan account 115 via various stages 145. A third workflow 150 is configured for opening a retail savings account 120 via various stages 155. As shown, the workflows can be configured to accommodate hopping across service paths and support inter-dependent stages 160. The workflows and their interdependencies can be configured differently depending on each organization's or bank's own requirements. As such, the number and type of stages in a workflow is flexible and decided by each individual bank. For example, the stages for servicing a request for the one or more banking product accounts can be similar in some respects and different in other respects from other banking product accounts offered within the same bank and across different banks.

Figure 2:
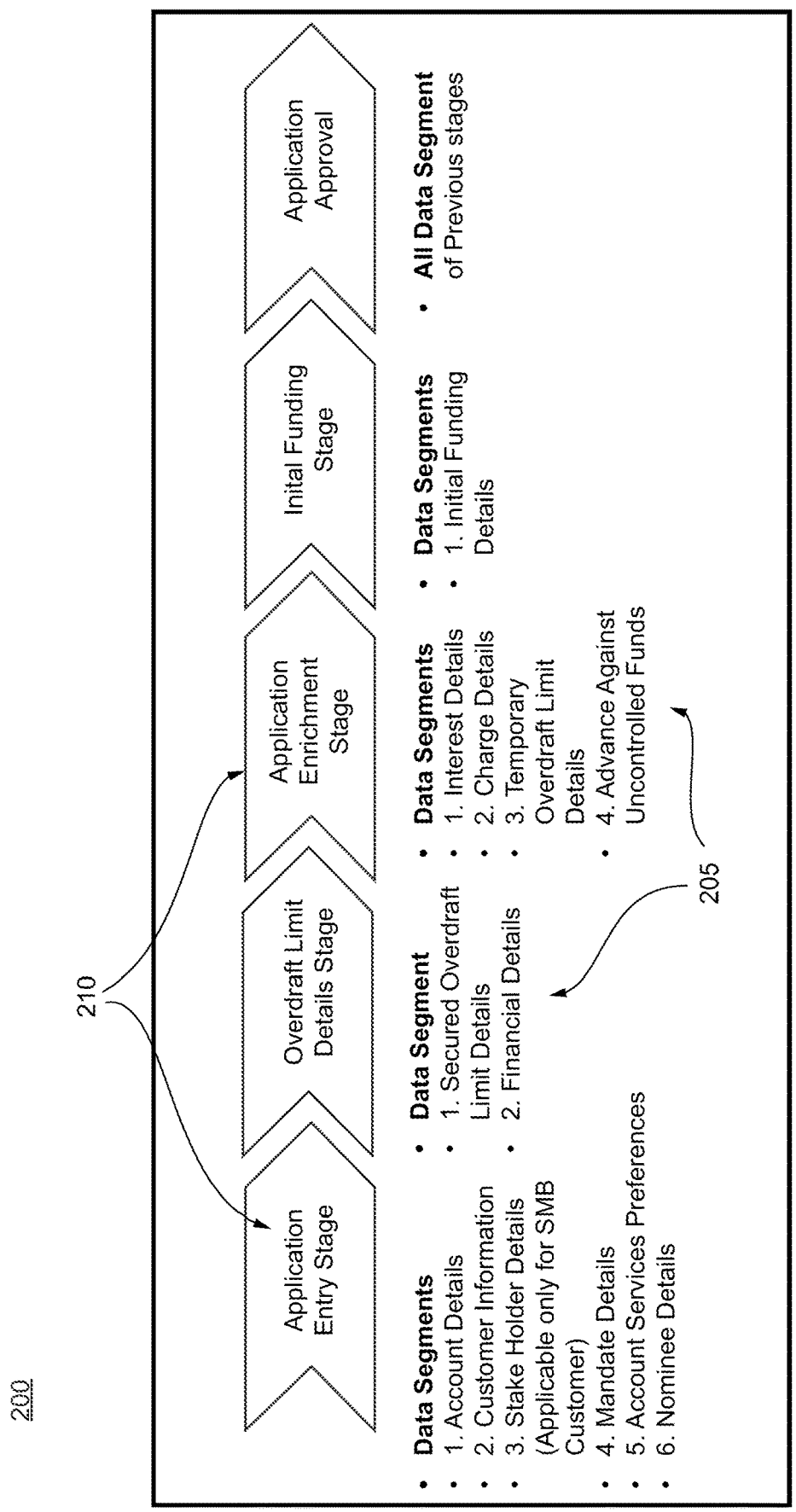
FIG. 2 depicts data that may be collected during specific stages of a workflow in accordance with various embodiments.

Each stage can be configured to seek specific data required at that stage. FIG. 2 represents the typical data 200 that may be collected during the specific stages of the third workflow 150 for the retail savings account 120. Data segments 205, which define the specific data to be captured, are configured for each stage 210 (e.g., at the Application Entry Stage the data segments 205 are configured to include: 1. Account Details, 2. Customer Information, 3. Stake Holder Details, 4. Mandate Details, 5. Account Services Preferences, and 6. Nominee Details). Consequently, stage specific decisions are a function of the specific data to be captured or parameters of the application for the account to be opened. For example, if the customer is new, then an onboarding process may need to be executed, whether an overdraft limit is required for the account to be opened dictates whether secured overdraft limit details and financial details should be obtained or are available, and whether an initial funding is required for the account to be opened dictates whether initial funding details should be obtained or are available. Moreover, some of the stages, and consequently data required for the stages (e.g., initial funding as depicted in FIGS. 1 and 2), can be dynamically hopped over or stepped into based on data captured in upstream or downstream stages and processes. The trigger for hopping over or stepping into stages can be defined using the data segments of the upstream or downstream stages and processes. For example, a trigger can be defined for the initial funding stage to be added when financial details collected for the data segment of the overdraft limit details stage and/or advance against uncollected funds for the data segment of the application enrichment stage are unable to be collected wholly or partially. Thus, each application can go through a different series of stages for a same account product depending on the stages hopped-over or stepped-into through the processing. The workflow(s), stages of the workflow(s), and various data segments defined for the stages are stored within a bank data repository and used as input into the machine-learning model to facilitate a prediction of completion time of a corresponding service request (e.g., opening an account).

Additionally, data fluidity needs to be factored into the completion time prediction—the workflows are not rigid but instead depend on the data that can be obtained for each process, the structure of the data being obtained, whether the data is obtained manually or automatically, and whether the data is optional or required—all of which must be taken into consideration to understand how the data fluidity will impact the timing of the service request. Stage position within the workflow and stage residence duration are central to capturing data fluidity for the various stages. The capture approach is based on three possible triggers for a stage: ENTRY (entry into a stage), REST (processing within the stage), EXIT (exit from the stage) and subsequent capture of relevant data for each scenario. The data capture for these various triggers defines the current position of the application within the stage and the overall workflow (described herein as just-in-time position). The data capture is used as additional input into the machine-learning model to facilitate a more accurate prediction of completion time of a service request (e.g., opening an account).

Figure 3:
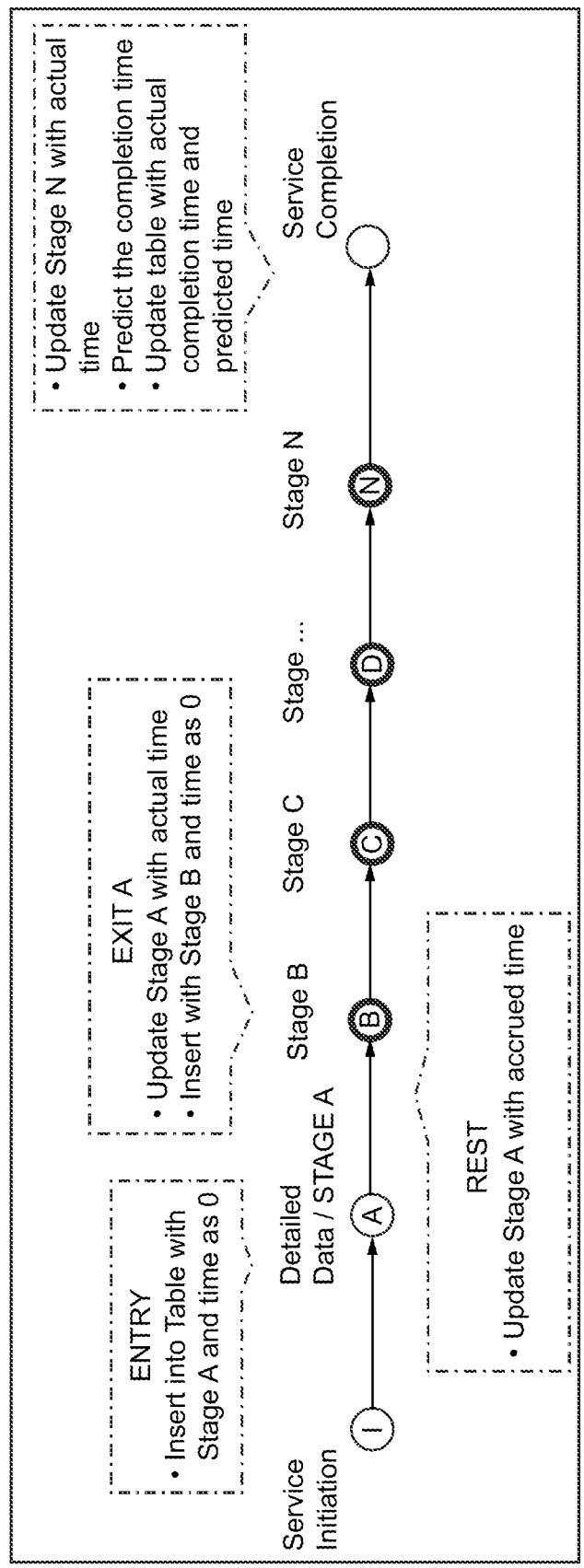
FIG. 3 depicts a representation of how data fluidity for the various stages is handled to capture just-in-time position of a service request within a workflow in accordance with various embodiments.

FIG. 3 shows a representation 300 of how data fluidity for the various stages is handled to capture just-in-time position of a product application within a workflow. A data structure such as a table (see for example Table 1 below) may be used to maintain the state of the data fluidity across the triggers and various stages and capture just-in-time position. Upon entry of the product application into a stage (Stage A in this example) of a workflow, a data entry is created in a data structure to record the ENTRY of the product application into the stage and an initial time step of 0. As the product application is processed in the stage in accordance with configured data segments and application parameters, a data entry is created in the data structure to record the REST of the product application within the stage (Stage A in this example) and actual accrued duration while in processing. The actual accrued time may be updated as the product application is processed in the stage. When processing of the product application in the stage is completed, a data entry is created in the data structure to record the EXIT of the product application from the stage (Stage A in this example), the actual duration spent by the product application within the stage, ENTRY of the application into the next stage (Stage B in this example), and an initial time step of 0 for the next stage (Stage B in this example).

TABLE 1

| | | Stage A |
|---|---|---|
| # | Triggers | Data Capture |
| | ENTRY | Stage A: 0 |
| | REST | Stage A: <Actual Accrued Duration> |
| | EXIT A/Stage B ENTRY | Stage A: <Actual Duration> |
| | | Stage B: 0 |

The ENTRY, REST, EXIT triggers are implemented across each of the defined workflow stages, irrespective of how many stages are defined, thereby making the entire solution agnostic of workflow configuration, yet this approach is able to capture the just-in-time positional information. As shown in FIG. 3, on EXIT of 'nth' Stage or on service completion, the following data are captured for posterity:
  Actual nth stage duration
  Predicted completion time for the service request (e.g., open account)
  Actual completion time for the service request (e.g., open account)
This data capture for EXIT of 'nth' Stage allows for tracking and analysis to be performed on the predictions being made by the machine-learning models. For example, the bank can track predictions of completion times for various service requests with respect to actual completion times, identify when drift of the machine-learning model occurs (i.e., the degradation of a model's prediction power due to changes in the environment, and thus the relationships between variables), and train or retrain machine-learning models on new data sets to correct for the drift.

Machine-Learning Training Framework

Figure 4:
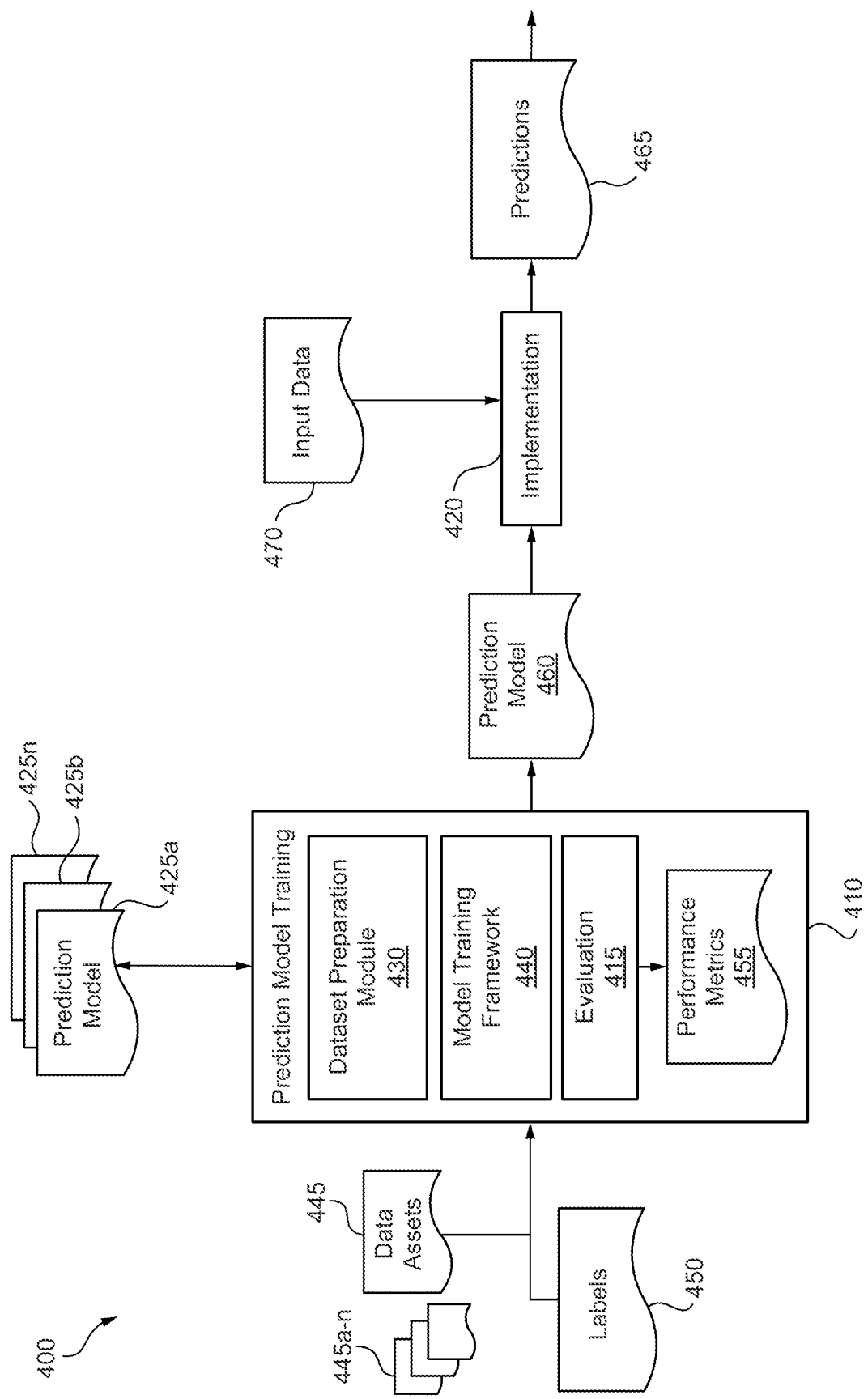
FIG. 4 depicts a block diagram illustrating a machine-learning system for training and deploying machine-learning models in accordance with various embodiments.

FIG. 4 is a block diagram illustrating a machine-learning system 400 in accordance with various embodiments. As shown in FIG. 4, the machine-learning system 400 includes various stages: a prediction model training stage 410 to build and train models, an evaluation stage 415 to evaluate performance of trained models, and an implementation stage 420 for implementing one or more models. The prediction model training stage 410 builds and trains one or more prediction models 425a-425n ('n' represents any natural number) to be used by the other stages (which may be referred to herein individually as a prediction model 425 or collectively as the prediction models 425). For example, the prediction models 425 can include a model for predicting the completion time of a service request (e.g., opening an account or multiple accounts). Still other types of prediction models may be implemented in other examples according to this disclosure.

A prediction model 425 can be a machine-learning ("ML") model, such as a convolutional neural network ("CNN"), e.g., an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier). A prediction model 425 can also be any other suitable ML model trained for providing a prediction, such as a Generalized linear model (GLM), Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The computing environment 100 may employ the same type of prediction model or different types of prediction models for providing predictions to users. In certain instances, the prediction model 425 performs regression analysis using a neural network, a GLM, or a Support Vector Machine. Still other types of prediction models may be implemented in other examples according to this disclosure.

To train the various prediction models 425, the training stage 410 is comprised of three main components: dataset preparation module 430, model training framework 440, and evaluation 415. The dataset preparation module 430 performs the processes of loading data assets 445, splitting the data assets 445 into training and validation sets 445 a-n so that the system can train and test the prediction models 425, and pre-processing of data assets 445. The splitting the data assets 445 into training and validation sets 445 a-n may be performed randomly (e.g., a 60/40% or 70/30%).

The training data 445a may include at least a subset of historical data about first parties (e.g., customers) and products offered by a second party (e.g., enterprises banks or other merchants). The historical data includes service application data, transaction related data, customer data, guarantor data, collateral data, credit bureau data, just-in-time stage positional data, or any combination thereof. The historical data can be obtained in various ways including image or text. The historical data can be transactional data, customer profiles, products, and product characteristics such as the workflows and data segments. For example, if the historical data is provided as images of transactions, the data preparation 430 may convert the images to text using an image-to-text converter (not shown) that performs text recognition (e.g., optical character recognition) to determine the text within the image. Additionally or alternatively, the data preparation module 430 may standardize the format of the historical data. In some instances, the historical data is provided by the second party or a third party. The training data 445a for a prediction model 425 may include the historical data and labels 450 corresponding to the historical data as a matrix or table of values. For example, for each customer and product, an indication of the correct completion time to be inferred by the prediction model 425 may be provided as ground truth information for labels 450. In some instances, the labels 450 may be obtained from the data structure used to maintain data fluidity as described with respect to FIG. 3 and Table. 1. The behavior of the prediction model 425 can then be adapted (e.g., through MinMax or ALS optimization or Gradient Descent) to minimize the difference between the generated inferences for various entities and the ground truth information.

The model training framework 440 performs the processes of determining hyperparameters for the model 425 and performing iterative operations of inputting examples from the training data 445a into the model 425 to find a set of model parameters (e.g., weights and/or biases) that minimizes a cost function(s) such as loss or error function for the model 425. The hyperparameters are settings that can be tuned or optimized to control the behavior of the model 425. Most models explicitly define hyperparameters that control different features of the models such as memory or cost of execution. However, additional hyperparameters may be defined to adapt the model 425 to a specific scenario. For example, regularization weight or strength. The cost function can be constructed to measure the difference between the outputs inferred using the models 445 and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the cost or loss function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to minimize this cost or loss function.

Once the set of model parameters are identified, the model 425 has been trained and the model training framework 440 performs the additional processes of testing or validation using the subset of testing data 445b (testing or validation data set). The testing or validation processes includes iterative operations of inputting utterances from the subset of testing data 445b into the model 425 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of test data 445a may be input into the model 425 to obtain output (in this example, one or more recognized entities), and the output is evaluated versus ground truth entities using correlation techniques such as Bland-Altman method and the Spearman's rank correlation coefficients. Further, performance metrics 455 may be calculated in evaluation stage 415 such as the error, accuracy, precision, recall, receiver operating characteristic curve (ROC), etc. The metrics 455 may be used in the evaluation stage 415 to analyze performance of the model 425 for providing recommendations.

The model training stage 410 outputs trained models including one or more trained prediction models 460. The one or more trained prediction models 460 may be deployed and used in the implementation stage 420 for providing predictions 465 to users. For example, prediction models 460 may receive input data 470 including a customer profile, a product and service request for the product, and characteristics of the product (e.g., a workflow for the service request and associated data segments) and provide predictions 465 to a user based on an estimated completion time for the service request.

Implementation—Systems and Techniques for Predicting a Completion Time

Prior to implementation of machine-learning techniques to predict completion time for service requests, the following are assumed to have been completed: (i) workflow design and configuration (as described with respect to FIG. 1), (ii) required data segments defined for the stages of the workflow (as described with respect to FIG. 2), and (iii) one or more machine-learning models trained using a machine-learning framework (e.g., built using Oracle Machine-Learning) for predicting completion times (as described with respect to FIG. 4).

Figure 5:
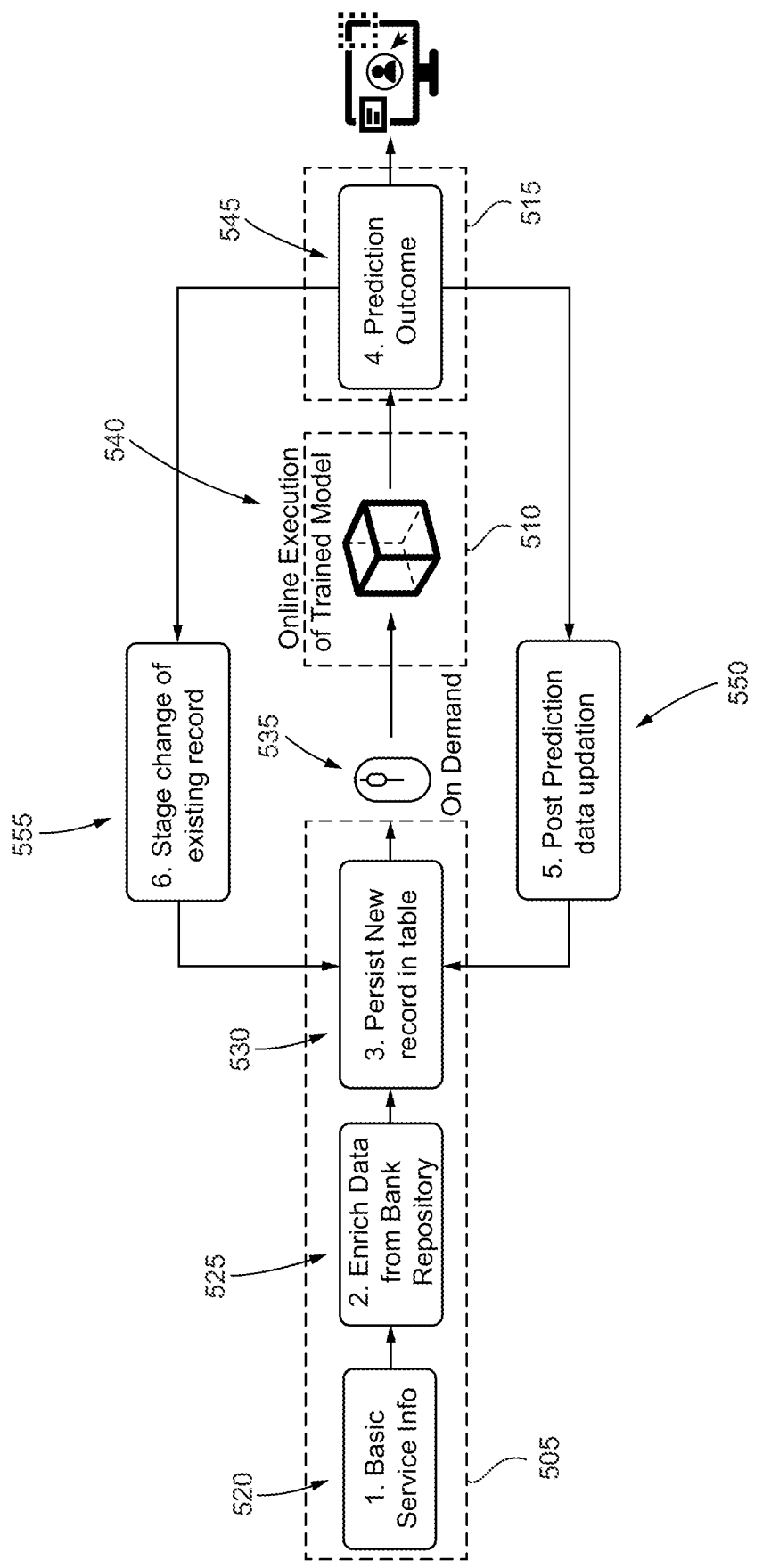
FIG. 5 depicts a block diagram of a computing system for predicting the completion time of a service request in accordance with various embodiments.

FIG. 5 depicts a block diagram of a computing system 500 for predicting the completion time of a service request in accordance with various embodiments. The system 500 includes a data module 505, completion time prediction module 510, and predicted outcomes module 515. The completion time prediction module 510 comprises one or more regression models trained and deployed as described with respect to prediction models 460 in the machine-learning system 400 of FIG. 4.

The computing system 500 starts at block 520, where initial data is obtained by data module 505 for a requested service (e.g., a request to open a new retail savings account). In some examples, the initial data includes basic information captured as part of a service initiation, for example, customer profile data, the service request, a list of products pertaining to the service request and their associated characteristics, and whether the customer is a prior existing customer of the enterprise. At block 525, the initial data is enriched by data module 505 with data from one or more data repositories of the enterprise. In some examples, the data for enrichment includes workflow(s), stages of the workflow(s), and various data segments defined for the stages. At block 530, the enriched data is then added by the data module 505 as a new record in a data structure (e.g., a table or matrix of values). The data structure includes the just-in-time position as described in detail with respect to FIG. 3 and Table. 1

At block 535, a user (e.g., a customer requesting the service or a user at the bank) can invoke a prediction (e.g., an online invocation using a web browser or application) by the completion time prediction module 510 of a completion time for the service request at any time while the application for the service request proceeds through the workflow(s). For example, initially at Stage A the user may invoke an online prediction by completion time prediction module 510 of a completion time for the service request, and subsequently at Stage D the user may invoke an updated online prediction by completion time prediction module 510 of a completion time for the service request. Although, block 535 is described with respect to a user invoking the prediction, it should be understood that a prediction can be invoked automatically by the computing system 500 at any anytime while the application for the service request proceeds through the workflow(s). For example, after every stage in the workflow the system 500 may invoke an updated prediction by completion time prediction module 510 of a completion time for the service request.

At block 540, the data structure from block 530 is input into a regression model of the completion time prediction module 510. The regression model is trained to determine a relationship between the inputs (the values in the data structure from block 530) and desired outputs (a completion time of a service request). More specifically, the regression model predicts values of a dependent variable (completion time) given values of one or more independent variables (predictors or features extracted from the data structure from block 530). The regression analysis of the model involves making a guess at what type of function would fit a given data set (the data structure from block 530) the best, whether that be a line, an nth degree polynomial, a logarithmic function, etc. To estimate the function, the model estimates coefficients of the function. This may be performed using ordinary least squares, which minimizes the sum of squared errors between the dataset and the function. Minimizing the squared errors will result in an estimate of the coefficients. Subsequently, the estimated coefficients are used to create an estimate for the independent variable (completion time). The output of the regression model is a predicted completion time of the service request, which is communicated to the predicted outcomes module 515.

At block 545, the predicted outcomes module 515 communicates the predicted completion time of the service request to the user (e.g., a customer requesting the service or a user at the bank). For example, the predicted outcomes module 515 may display the predicted completion time on a display via the web browser or application used to invoke the prediction. Additionally or alternatively, the predicted outcomes module 515 may store the predicted completion time in a data repository, for example, as part of the data structure described with respect to FIG. 3 and Table. 1.

At block 550, any change in data (e.g., accruing duration of stay in a stage, collection of data defined by a data segment, or completion of a portion of a data segment) of an existing service application record, will be updated in the data structure from block 530. At block 555, any stage movement (e.g., the application passing from Stage B to Stage C or from Stage D back to Stage B), will trigger data fluidity and data will be updated in the data structure from block 530. Accordingly, any subsequent invocation of a prediction by the completion time prediction module 510 will include the updated data structure from block 550 and/or 555 being used as input into the regression model of the completion time prediction module 510.

Figure 6:
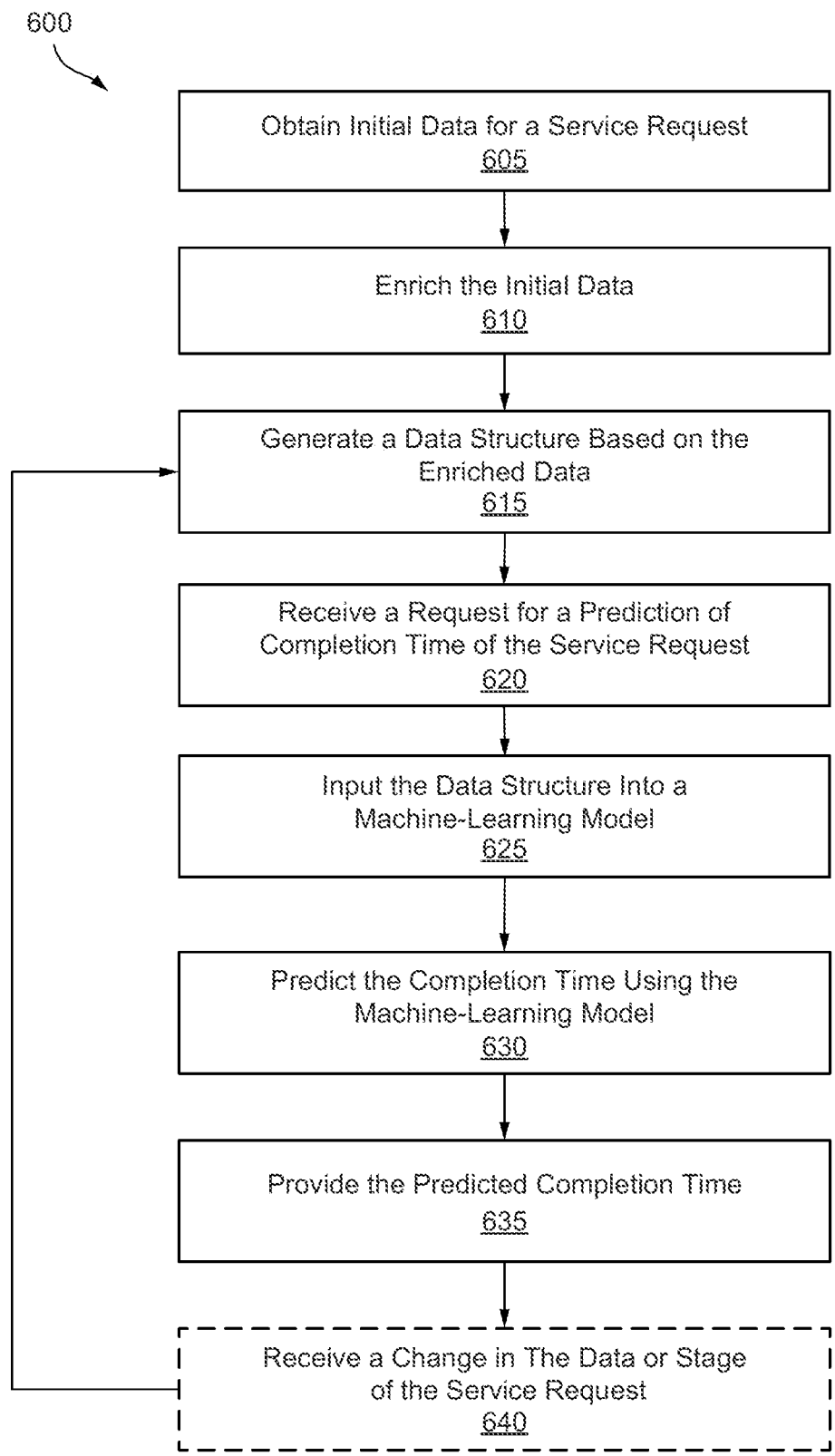
FIG. 6 depicts a flowchart illustrating a process for predicting the completion time of a service request in accordance with various embodiments.

FIG. 6 depicts a flowchart illustrating a process 600 for predicting the completion time of a service request in accordance with various embodiments. The process 600 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 600 presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order, or some steps may also be performed in parallel. In certain embodiments, such as in the embodiments depicted in FIGS. 1-5, the processing depicted in FIG. 6 may be performed by a computing environment (e.g., machine-learning system 400 and computing system 500) training, testing, and deploying machine learning models for predicting the completion time of a service request.

In step 605, initial data is obtained for a service request. The initial data comprises basic information captured as part of a service initiation including profile data for a customer originating the service request, the service request, one or more products pertaining to the service request, and characteristics associated with the one or more products.

In step 610, the initial data is enriched with data from one or more repositories of an enterprise executing the service request. The enriching comprises augmenting the initial data with the data from the one or more repositories to generate enriched data, and wherein the data comprises a workflow for each of the one or more products, stages of each workflow, and data segments defined for the stages.

In step 615, a data structure is generated based on the enriched data. The data structure comprises independent variables extracted from the enriched data. The independent variables include a just-in-time position of the service request within each workflow. In some instances, generating the just-in-time position of the service request comprises: upon entry of the service request into a stage of the workflow for each of the one or more products, a data entry is created in the data structure to record an ENTRY of the service request into the stage and an initial time step of 0; as the service request is processed in the stage in accordance with configured data segments and application parameters, a data entry is created in the data structure to record a REST of the service request within the stage and actual accrued duration while in processing; and when processing of the service request in the stage is completed, a data entry is created in the data structure to record an EXIT of the service request from the stage, an actual duration spent by the service request within the stage, ENTRY of the service request into a next stage, and an initial time step of 0 for the next stage In step 620, a request is received for a prediction of a completion time for the service request at a first time during processing of the service request in accordance with each workflow.

In step 625, in response to receiving the request for the prediction, the data structure is input into a machine-learning regression model.

In step 630, a completion time for the service request is predicted using the machine-learning regression model. The predicting comprises determining a relationship between the independent values and the completion time of the service request.

In step 635, the completion time for the service request is provided. In some instances, providing the completion time or an updated completion time comprises communicating the completion time or the updated completion time to a user.

In optional step 640, a change in data is received and the data structure is updated in accordance with the change in the data. The change in data includes accruing duration of a stay of the service request in a stage, collection of data defined by one or more of the data segments, completion of a portion of one or more data segments, or a combination thereof. Additionally or alternatively, a change in stage of the service request is received and the data structure is updated in accordance with the change in the stage. In some instances, updating the data structure comprises updating the just-in-time position of the service request based on the change in the data and/or the change in the stage. In some instances, a subsequent request for the prediction of an updated completion time for the service request is received at a second time during processing of the service request in accordance with each workflow, in response to receiving the subsequent request for the prediction, the updated data structure is input into the machine-learning regression model, the updated completion time for the service request is predicted using the machine-learning regression model, and the updated completion time for the service request is provided.

Illustrative Systems

Figure 7:
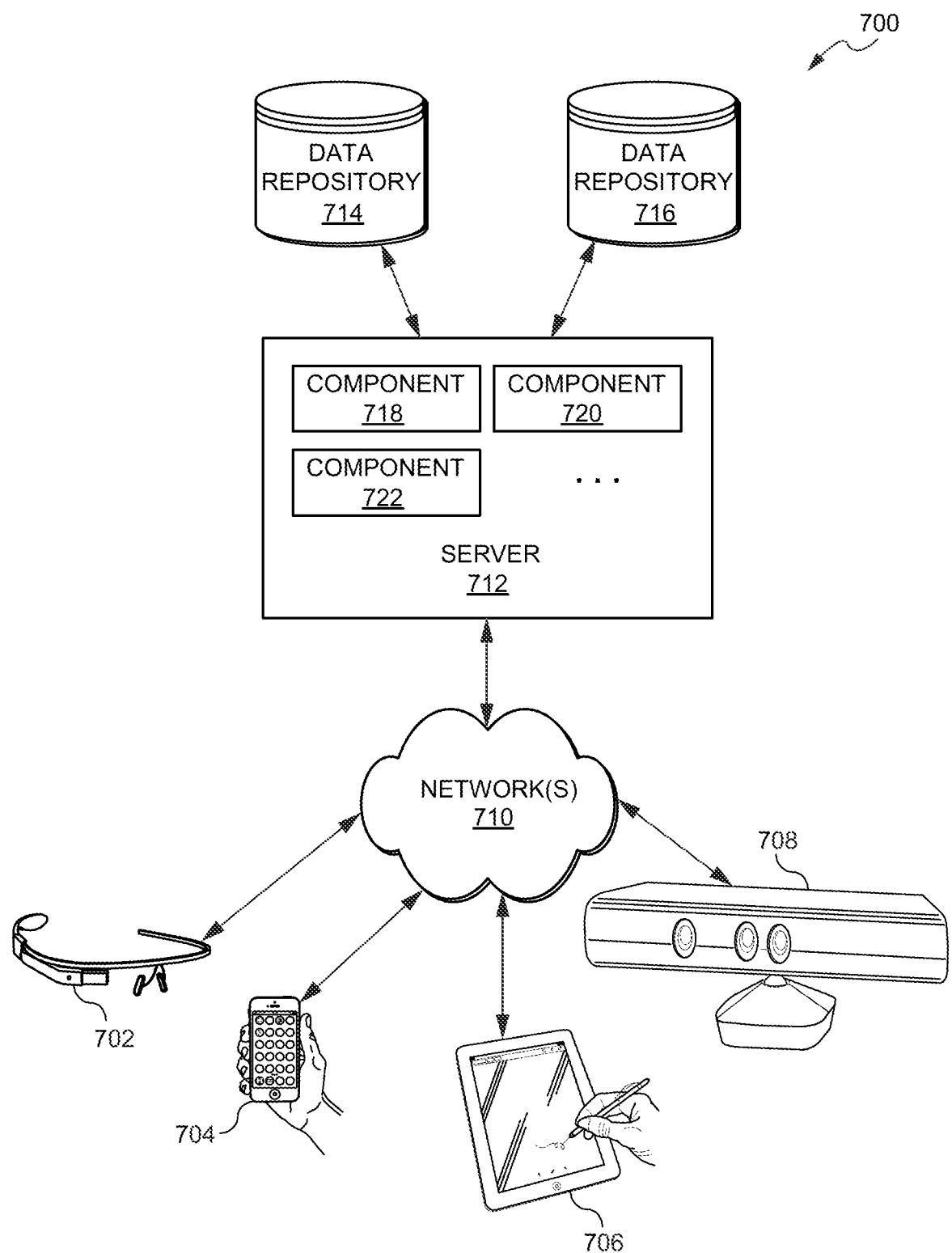
FIG. 7 depicts a simplified diagram of a distributed system for implementing various embodiments.

FIG. 7 depicts a simplified diagram of a distributed system 700. In the illustrated example, distributed system 700 includes one or more client computing devices 702, 704, 706, and 708, coupled to a server 712 via one or more communication networks 710. Clients computing devices 702, 704, 706, and 708 may be configured to execute one or more applications.

In various examples, server 712 may be adapted to run one or more services or software applications that enable one or more embodiments described in this disclosure. In certain examples, server 712 may also provide other services or software applications that may include non-virtual and virtual environments. In some examples, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The example shown in FIG. 7 is thus one example of a distributed system for implementing an example system and is not intended to be limiting.

Users may use client computing devices 702, 704, 706, and/or 708 to execute one or more applications, models or machine learning pipeline, which may generate one or more events or models that may then be implemented or serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad)®, personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose server computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 may include one or more virtual machines running virtual operating systems, or other computing architectures involving virtualization such as one or more flexible pools of logical storage devices that may be virtualized to maintain virtual storage devices for the server. In various examples, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain examples. For example, one or more of the data repositories 714, 716 may be used to store information such as information related to model performance or data for use by a model based system used by server 712 when performing various functions in accordance with various embodiments. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain examples, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 714, 716 may also be used by applications to store application data. The data repositories used by applications may be of different types such as, for example, a key-value store repository, an object store repository, or a general storage repository supported by a file system.

Figure 8:
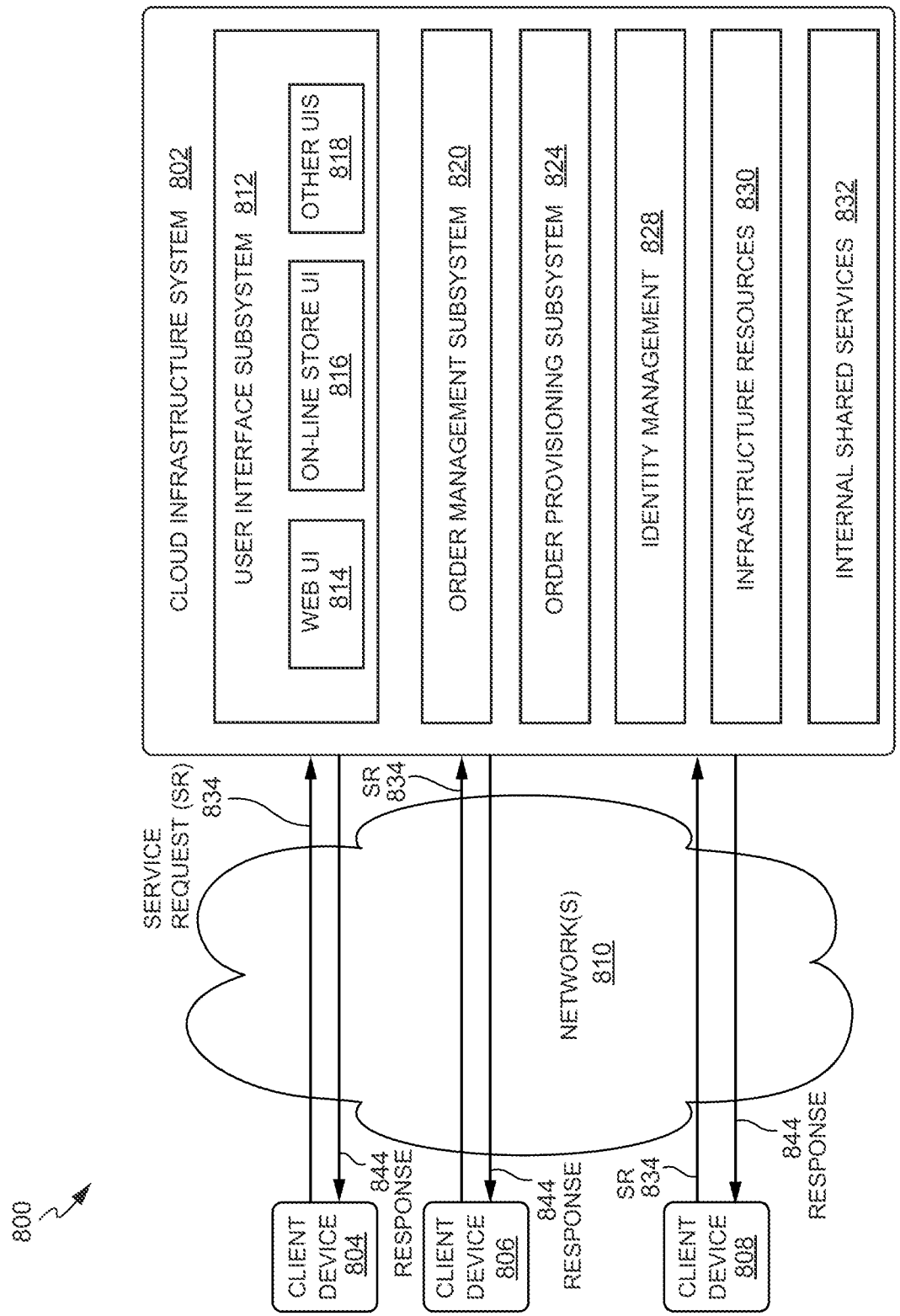
FIG. 8 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 8 is a simplified block diagram of a cloud-based system environment in which various services may be offered as cloud services in accordance with certain examples. In the example depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The example depicted in FIG. 8 is only one example of a cloud infrastructure system and is not intended to be limiting. It should be appreciated that, in some other examples, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative examples.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a user may request the cloud infrastructure system to take a certain action such as make a prediction, as described above, and/or provide services for a model based system as described herein. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer may be an individual or an enterprise. In certain other examples, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 802 and the services provided may be shared by several organizations in a related community. Various other models such as hybrids of the above mentioned models may also be used.

Client computing devices 804, 806, and 808 may be of different types (such as client computing devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request information or action from a model based system as described in this disclosure.

In some examples, the processing performed by cloud infrastructure system 802 for providing services may involve model training and deployment. This analysis may involve using, analyzing, and manipulating datasets to train and deploy one or more models. This analysis may be performed by one or more processors, possibly processing the data in parallel, performing simulations using the data, and the like. For example, big data analysis may be performed by cloud infrastructure system 802 for generating and training one or more models for a model based system. The data used for this analysis may include structured data (e.g., data stored in a database or structured according to a structured model) and/or unstructured data (e.g., data blobs (binary large objects)).

As depicted in the example in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like. In certain examples, the storage virtual machines that are available for servicing storage requested from applications may be part of cloud infrastructure system 802. In other examples, the storage virtual machines may be part of different systems.

In certain examples, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a service offered by cloud infrastructure system 802. As part of the order, the customer may provide information identifying a model based system for which the service is to be provided and optionally one or more credentials for the model based system.

In certain examples, such as the example depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 802 as part of the provisioning process. Cloud infrastructure system 802 may generate an application ID and select a storage virtual machine for an application from among storage virtual machines provided by cloud infrastructure system 802 itself or from storage virtual machines provided by other systems other than cloud infrastructure system 802.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain examples, for a customer requesting the service, the response may include a model based system ID generated by cloud infrastructure system 802 and information identifying a model based system selected by cloud infrastructure system 802 for the model based system corresponding to the model based system ID.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain examples, cloud infrastructure system 802 comprises an identity management subsystem (IMS) 828 that is configured to manage customer information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
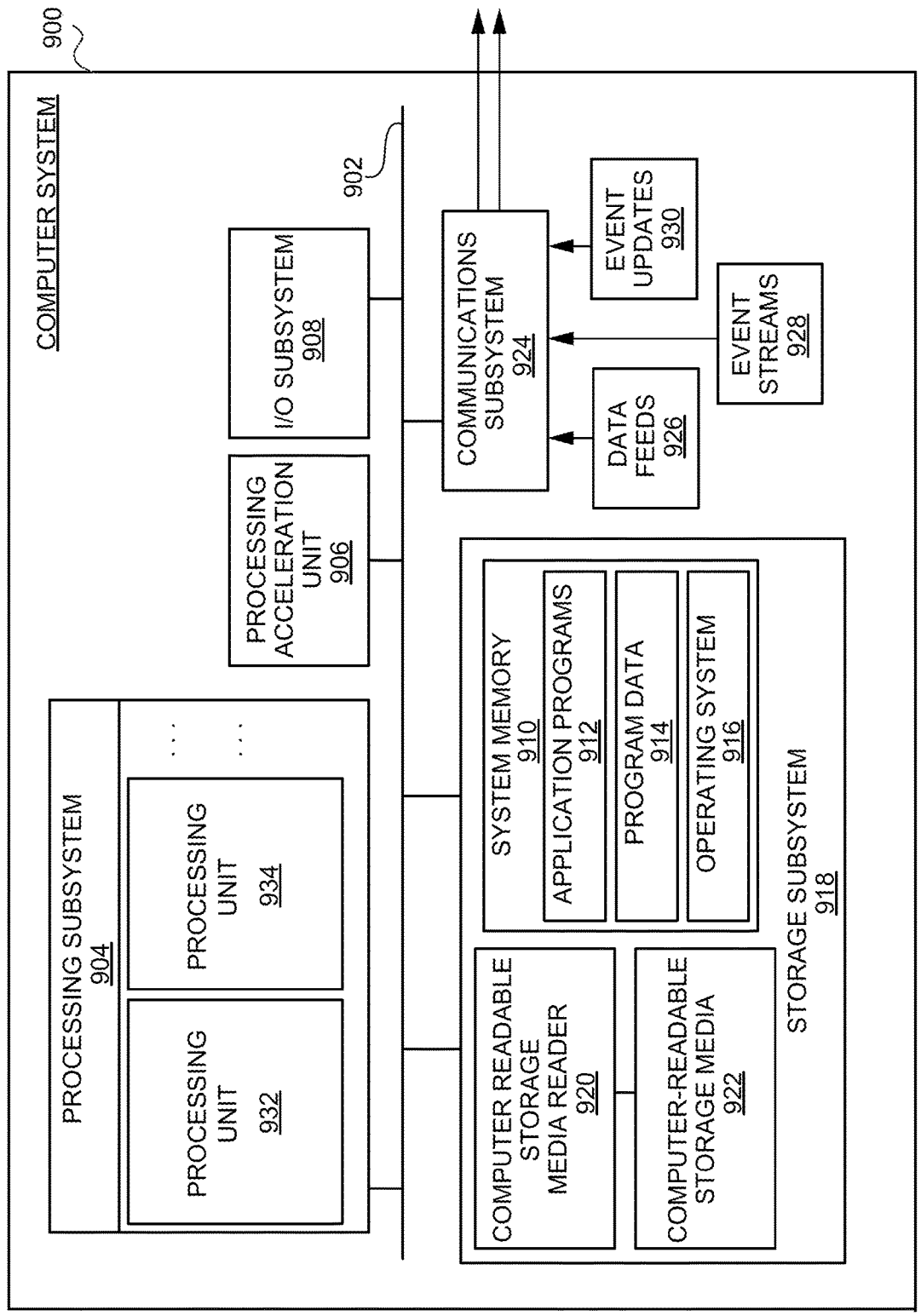
FIG. 9 illustrates an example computer system that may be used to implement various embodiments.

FIG. 9 illustrates an example of computer system 900. In some examples, computer system 900 may be used to implement any of the digital assistant or model based system within a distributed environment, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative examples of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 may be organized into one or more processing units 932, 934, etc. A processing unit may include one or more processors, one or more cores from the same or different processors, a combination of cores and processors, or other combinations of cores and processors. In some examples, processing subsystem 904 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 904 may execute instructions stored in system memory 910 or on computer readable storage media 922. In various examples, the processing units may execute a variety of programs or code instructions and may maintain multiple concurrently executing programs or processes. At any given time, some or all of the program code to be executed may be resident in system memory 910 and/or on computer-readable storage media 922 including potentially on one or more storage devices. Through suitable programming, processing subsystem 904 may provide various functionalities described above. In instances where computer system 900 is executing one or more virtual machines, one or more processing units may be allocated to each virtual machine.

In certain examples, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some examples. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide authentication in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some examples. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 918 may also include a computer-readable storage media reader 920 that may further be connected to computer-readable storage media 922. Reader 920 may receive and be configured to read data from a memory device such as a disk, a flash drive, etc.

In certain examples, computer system 900 may support virtualization technologies, including but not limited to virtualization of processing and memory resources. For example, computer system 900 may provide support for executing one or more virtual machines. In certain examples, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, when computer system 900 is used to implement bot system 120 depicted in FIG. 1, the communication subsystem may be used to communicate with a model based system selected for an application.

Communication subsystem 924 may support both wired and/or wireless communication protocols. In certain examples, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802. XX family standards, or other mobile communication technologies, or any combination thereof), global positioning system (GPS) receiver components, and/or other components. In some examples, communications subsystem 924 may provide wired network connectivity (e.g., Ethernet) in addition to or instead of a wireless interface.

Communication subsystem 924 may receive and transmit data in various forms. In some examples, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 924 may be configured to receive data in the form of continuous data streams, which may include event streams 928 of real-time events and/or event updates 930, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof While illustrative examples of the application have been described in detail herein, it is to be understood that the inventive concepts may be otherwise variously embodied and employed, and that the appended claims are intended to be construed to include such variations, except as limited by the prior art.

What is claimed:

1. A computer-implemented method comprising:
   obtaining initial data for a service request, wherein the initial data comprises basic information captured as part of a service initiation including profile data for a user originating the service request, the service request, one or more products pertaining to the service request, and characteristics associated with the one or more products;
   enriching the initial data with data from one or more repositories of an enterprise executing the service request, wherein the enriching comprises augmenting the initial data with the data from the one or more repositories to generate enriched data, and wherein the data comprises a workflow for each of the one or more products, stages of each workflow, and data segments defined for the stages;
   generating a data structure comprising independent variables extracted from the enriched data, wherein the independent variables include a just-in-time position of the service request within each workflow;
   updating the data structure in real time based on a stage position change being triggered as the service request is processed through the workflow for each of the one or more products, wherein updating the data structure comprises updating the just-in-time position of the service request based on the stage position change;
   receiving a request for a prediction of a completion time for the service request at a first time during processing of the service request in accordance with each workflow;
   in response to receiving the request for the prediction, inputting the updated data structure into a machine-learning regression model;
   predicting, using the machine-learning regression model, a completion time for the service request, wherein the predicting comprises determining a relationship between the independent values and the completion time of the service request; and
   providing the completion time for the service request.

2. The computer-implemented method of claim 1, wherein generating the just-in-time position of the service request comprises:
   upon entry of the service request into a stage of the workflow for each of the one or more products, a data entry is created in the data structure to record an ENTRY of the service request into the stage and an initial time step of 0;
   as the service request is processed in the stage in accordance with configured data segments and application parameters, a data entry is created in the data structure to record a REST of the service request within the stage and actual accrued duration while in processing; and
   when processing of the service request in the stage is completed, a data entry is created in the data structure to record an EXIT of the service request from the stage, an actual duration spent by the service request within the stage, ENTRY of the service request into a next stage, and an initial time step of 0 for the next stage.

3. The computer-implemented method of claim 1, further comprising receiving a change in data including accruing duration of a stay of the service request in a stage, collection of data defined by one or more of the data segments, completion of a portion of one or more data segments, or a combination thereof, and wherein the data structure is updated in accordance with the change in the data.

4. The computer-implemented method of claim 3, further comprising:
   receiving a subsequent request for the prediction of an updated completion time for the service request at a second time during processing of the service request in accordance with each workflow;
   in response to receiving the subsequent request for the prediction, inputting the updated data structure into the machine-learning regression model;
   predicting, using the machine-learning regression model, the updated completion time for the service request, wherein the predicting comprises determining the relationship between the independent values and the updated completion time of the service request; and
   providing the updated completion time for the service request.

5. The method of claim 1, wherein the providing the completion time comprises communicating the completion time to a user.

6. A computing system comprising:
   a processor; and
   a memory coupled to the one or more processors, the memory storing a plurality of instructions executable by the one or more processors, the plurality of instructions comprising instructions that when executed by the one or more processors cause the one or more processors to perform processing comprising:
      obtaining initial data for a service request, wherein the initial data comprises basic information captured as part of a service initiation including profile data for a user originating the service request, the service request, one or more products pertaining to the service request, and characteristics associated with the one or more products;
      enriching the initial data with data from one or more repositories of an enterprise executing the service request, wherein the enriching comprises augmenting the initial data with the data from the one or more repositories to generate enriched data, and wherein the data comprises a workflow for each of the one or more products, stages of each workflow, and data segments defined for the stages;

generating a data structure comprising independent variables extracted from the enriched data, wherein the independent variables include a just-in-time position of the service request within each workflow;

updating the data structure in real time based on a stage position change being triggered as the service request is processed through the workflow for each of the one or more products, wherein updating the data structure comprises updating the just-in-time position of the service request based on the stage position change;

receiving a request for a prediction of a completion time for the service request at a first time during processing of the service request in accordance with each workflow;

in response to receiving the request for the prediction, inputting the data structure into a machine-learning regression model;

predicting, using the machine-learning regression model, a completion time for the service request, wherein the predicting comprises determining a relationship between the independent values and the completion time of the service request; and providing the completion time for the service request.

7. The computing system of claim 6, wherein generating the just-in-time position of the service request comprises:

upon entry of the service request into a stage of the workflow for each of the one or more products, a data entry is created in the data structure to record an ENTRY of the service request into the stage and an initial time step of 0;

as the service request is processed in the stage in accordance with configured data segments and application parameters, a data entry is created in the data structure to record a REST of the service request within the stage and actual accrued duration while in processing; and when processing of the service request in the stage is completed, a data entry is created in the data structure to record an EXIT of the service request from the stage, an actual duration spent by the service request within the stage, ENTRY of the service request into a next stage, and an initial time step of 0 for the next stage.

8. The computing system of claim 6, wherein the processing further comprises receiving a change in data including accruing duration of a stay of the service request in a stage, collection of data defined by one or more of the data segments, completion of a portion of one or more data segments, or a combination thereof, and wherein the data structure is updated in accordance with the change in the data.

9. The computing system of claim 8, wherein the processing further comprises:

receiving a subsequent request for the prediction of an updated completion time for the service request at a second time during processing of the service request in accordance with each workflow;

in response to receiving the subsequent request for the prediction, inputting the updated data structure into the machine-learning regression model;

predicting, using the machine-learning regression model, the updated completion time for the service request, wherein the predicting comprises determining the relationship between the independent values and the updated completion time of the service request; and providing the updated completion time for the service request.

10. The computing system of claim 6, wherein the providing the completion time comprises communicating the completion time to a user.

11. A non-transitory computer-readable memory storing a plurality of instructions executable by one or more processors, the plurality of instructions comprising instructions that when executed by the one or more processors cause the one or more processors to perform processing comprising:

obtaining initial data for a service request, wherein the initial data comprises basic information captured as part of a service initiation including profile data for a user originating the service request, the service request, one or more products pertaining to the service request, and characteristics associated with the one or more products;

enriching the initial data with data from one or more repositories of an enterprise executing the service request, wherein the enriching comprises augmenting the initial data with the data from the one or more repositories to generate enriched data, and wherein the data comprises a workflow for each of the one or more products, stages of each workflow, and data segments defined for the stages;

generating a data structure comprising independent variables extracted from the enriched data, wherein the independent variables include a just-in-time position of the service request within each workflow;

updating the data structure in real time based on a stage position change being triggered as the service request is processed through the workflow for each of the one or more products, wherein updating the data structure comprises updating the just-in-time position of the service request based on the stage position change;

receiving a request for a prediction of a completion time for the service request at a first time during processing of the service request in accordance with each workflow;

in response to receiving the request for the prediction, inputting the data structure into a machine-learning regression model;

predicting, using the machine-learning regression model, a completion time for the service request, wherein the predicting comprises determining a relationship between the independent values and the completion time of the service request; and providing the completion time for the service request.

12. The non-transitory computer-readable memory of claim 11, wherein generating the just-in-time position of the service request comprises:

upon entry of the service request into a stage of the workflow for each of the one or more products, a data entry is created in the data structure to record an ENTRY of the service request into the stage and an initial time step of 0;

as the service request is processed in the stage in accordance with configured data segments and application parameters, a data entry is created in the data structure to record a REST of the service request within the stage and actual accrued duration while in processing; and when processing of the service request in the stage is completed, a data entry is created in the data structure to record an EXIT of the service request from the stage, an actual duration spent by the service request within the stage, ENTRY of the service request into a next stage, and an initial time step of 0 for the next stage.

13. The non-transitory computer-readable memory of claim 11, wherein the processing further comprises receiving a change in data including accruing duration of a stay of the service request in a stage, collection of data defined by one or more of the data segments, completion of a portion of one or more data segments, or a combination thereof, and wherein the data structure is updated in accordance with the change in the data.

14. The non-transitory computer-readable memory of claim 13, wherein the processing further comprises:
receiving a subsequent request for the prediction of an updated completion time for the service request at a second time during processing of the service request in accordance with each workflow;
in response to receiving the subsequent request for the prediction, inputting the updated data structure into the machine-learning regression model;
predicting, using the machine-learning regression model, the updated completion time for the service request, wherein the predicting comprises determining the relationship between the independent values and the updated completion time of the service request; and
providing the updated completion time for the service request.

* * * * *